US008452225B2

(12) United States Patent
Burstein et al.

(10) Patent No.: US 8,452,225 B2
(45) Date of Patent: May 28, 2013

(54) METHODS FOR AUTOMATED ESSAY ANALYSIS

(75) Inventors: Jill Burstein, Princeton, NJ (US); Daniel Marcu, Marina del Rey, CA (US); Vyacheslav Andreyev, Ewing, NJ (US); Martin Sanford Chodorow, New York, NY (US); Claudia Leacock, New York, NY (US)

(73) Assignee: Educational Testing Service, Princeton, NJ (US)

( * ) Notice: Subject to any disclaimer, the term of this patent is extended or adjusted under 35 U.S.C. 154(b) by 425 days.

(21) Appl. No.: 12/785,721

(22) Filed: May 24, 2010

(65) Prior Publication Data

US 2010/0233666 A1    Sep. 16, 2010

Related U.S. Application Data

(63) Continuation of application No. 10/948,417, filed on Sep. 22, 2004, now Pat. No. 7,729,655, which is a continuation of application No. 10/052,380, filed on Jan. 23, 2002, now Pat. No. 6,796,800.

(60) Provisional application No. 60/263,223, filed on Jan. 23, 2001.

(51) Int. Cl.
*G09B 11/00* (2006.01)
*G09B 7/00* (2006.01)

(52) U.S. Cl.
CPC ....................................... *G09B 7/00* (2013.01)
USPC ........................................................ 434/353

(58) Field of Classification Search
USPC ........................................................ 434/353
See application file for complete search history.

(56) References Cited

U.S. PATENT DOCUMENTS

| | | | |
|---|---|---|---|
| 4,958,284 A | 9/1990 | Bishop et al. |
| 4,978,305 A | 12/1990 | Kraft |
| 5,437,554 A | 8/1995 | Clark et al. |
| 5,458,493 A | 10/1995 | Clark et al. |

(Continued)

FOREIGN PATENT DOCUMENTS

| | | |
|---|---|---|
| GB | 2388699 A | 11/2003 |
| JP | 04-090055 | 3/1992 |

(Continued)

OTHER PUBLICATIONS

Harada, Takashi, et al.; Automatic Eraction of the Subject Bearing Sentences; School of Library and information Science, Keio University, Tokyo; May 18, 1993; pp. 17-26.

(Continued)

*Primary Examiner* — Kathleen Mosser
(74) *Attorney, Agent, or Firm* — Jones Day

(57) ABSTRACT

Systems and methods for creating a mathematical model for use in identifying discourse elements are described. A plurality of first essays relating to a particular subject are received, where each first essay is in an electronic format. Annotations for each first essay are received, where each annotation identifies at least one discourse element. Features are identified with a processor, where each feature is exhibited by at least one identified discourse element. Empirical frequencies are computed with a processor, where each empirical frequency relates to the presence of a feature with respect to the identified discourse elements across the plurality of first essays. Each empirical frequency is associated with the related identified discourse element with a processor. The empirical frequencies are utilized to select discourse elements in at least one second essay.

19 Claims, 2 Drawing Sheets

U.S. PATENT DOCUMENTS

| | | | |
|---|---|---|---|
| 5,466,159 | A | 11/1995 | Clark et al. |
| 5,558,521 | A | 9/1996 | Clark et al. |
| 5,672,060 | A | 9/1997 | Poor |
| 5,690,497 | A | 11/1997 | Clark et al. |
| 5,709,551 | A | 1/1998 | Clark et al. |
| 5,716,213 | A | 2/1998 | Clark et al. |
| 5,718,591 | A | 2/1998 | Clark et al. |
| 5,735,694 | A | 4/1998 | Clark et al. |
| 5,752,836 | A | 5/1998 | Clark et al. |
| 5,827,070 | A | 10/1998 | Kershaw et al. |
| 5,878,386 | A | 3/1999 | Coughlin |
| 5,987,302 | A | 11/1999 | Driscoll et al. |
| 6,115,683 | A | 9/2000 | Burstein et al. |
| 6,155,839 | A | 12/2000 | Clark et al. |
| 6,159,018 | A | 12/2000 | Clark et al. |
| 6,168,440 | B1 | 1/2001 | Clark et al. |
| 6,181,909 | B1 | 1/2001 | Burstein et al. |
| 6,183,260 | B1 | 2/2001 | Clark et al. |
| 6,183,261 | B1 | 2/2001 | Clark et al. |
| 6,193,521 | B1 | 2/2001 | Clark et al. |
| 6,267,601 | B1 | 7/2001 | Jongsma et al. |
| 6,332,143 | B1 | 12/2001 | Chase |
| 6,356,864 | B1 | 3/2002 | Foltz et al. |
| 6,366,759 | B1 | 4/2002 | Burstein et al. |
| 6,461,166 | B1 | 10/2002 | Berman |
| 6,558,166 | B1 | 5/2003 | Clark et al. |
| 6,796,800 | B2 | 9/2004 | Burstein et al. |
| 7,088,949 | B2 | 8/2006 | Burstein et al. |
| 7,127,208 | B2 | 10/2006 | Burstein et al. |
| 2002/0083104 | A1 | 6/2002 | Polanyi et al. |
| 2003/0031996 | A1 | 2/2003 | Robinson |
| 2003/0149692 | A1 | 8/2003 | Mitchell |
| 2005/0042592 | A1 | 2/2005 | Burstein et al. |
| 2007/0077542 | A1 | 4/2007 | Burstein et al. |

FOREIGN PATENT DOCUMENTS

| | | |
|---|---|---|
| JP | 06-231178 | 8/1994 |
| JP | 07-182373 | 7/1995 |
| JP | 09-016630 | 1/1997 |
| JP | 09-016631 | 1/1997 |
| JP | 2000-029894 | 1/2000 |
| WO | WO 2002/059857 A1 | 8/2002 |
| WO | WO 2004/001700 A1 | 12/2003 |
| WO | WO 2004/003689 A2 | 1/2004 |
| WO | 2004061593 A2 | 7/2004 |

OTHER PUBLICATIONS

Marcu, Daniel; The Rhetorical Parsing of Natural Language Texts; Proceedings of the 35th Annual Meeting of Assoc. For Computational Linguistics; 1997; pp. 96-103.

Mann, et al.; Rhetorical Structure Theory: Toward a functional theory of text organization; 1988; Text 8(3):243-281.

Daume et al.; The Importance of Lexicalized Syntax Models for Natural Language Generation Tasks; Proc. of the 2nd International Conference on Natural Language Generation; 2002.

Carlson, et al.; An Empirical Study of the Relation Between Abstracts, Extracts and the Discourse Structure of Texts; Proc. of the Document Understanding Conference (DUC-2001); New Orleans, LA; Sep. 13-14.

Marcu, Daniel; The Theory and Practice of Discourse Parsing and Summarization; MIT Press; 2000 (TOC).

Burstein, Jill, Chodorow, Martin; Automated Essay Scoring for Non-native English Speakers; pp. 68-75; 1999.

Burstein, Jill; The E-rater Scoring Engine: Automated Essay Scoring with Natural Language Processing; Automated Essay Scoring, Ch. 7; pp. 113-121; 2003.

Burstein, Jill, Marcu, Daniel, Knight, Kevin; Finding the Write Stuff: Automatic Identification of Discourse Structure in Student Essays; Natural Language Processing, IEEE Computer Society; pp. 32-39; 2003.

Burstein, Jill, Chodorow, Martin; Directions in Automated Essay Analysis; The Oxford Handbook of Applied Linguistics, Ch. 37; pp. 487-497; 2002.

Burstein, Jill, Kukich, Karen, Wolff, Susanne, Lu, Chi, Chodorow, Martin, Braden-Harder, Lisa, Harris, Mary Dee; Automated Scoring Using a Hybrid Feature Identification Technique; Annual Meeting of the Association of Computational Linguistics; Montreal, Canada; 1998.

Burstein, Jill, Marcu, Daniel, Andreyev, Slava, Chodorow, Martin; Towards Automatic Classification of Discourse Elements in Essays; Annual Meeting of Association for Computational Linguistics; Toulouse, France; 2001.

Chodorow, Martin, Leacock, Claudia; An Unsupervised Method for Detecting Grammatical Errors; pp. 140-147; 2000.

Elliott, Scott; IntelliMetric: From Here to Validity; Automated Essay Scoring, Ch. 5; pp. 71-86; 2003.

Harada, Takashi, Hosono, Kimio, Nomiyama, Hiroshi, Morohashi, Masayuki; Automatic Extraction of the Subject Bearing Sentences; School of Library and Information Science, Keio University, Tokyo; pp. 17-26; 1993.

Ishioka, Tsunenori; Computerized Automated Essay Scoring System E-rater; University Entrance Exam Forum, National Center for University Entrance Examinations, No. 24; pp. 71-76; 2001.

Krippendorff, Klaus; Content Analysis: An Introduction to Its Methodology; The SAGE CommText Series, vol. 5; 1980.

Landauer, Thomas, Laham, Darrell, Foltz, Peter; Automated Scoring and Annotation of Essays with the Intelligent Essay Assessor; Automated Scoring of Essay Content, Ch. 6; pp. 87-112; 2003.

Larkey, Leah; Automated Essay Grading Using Text Categorization Techniques; Center for Intelligent Information Retrieval; pp. 90-95; 1998.

Linear Models (Statistics Toolbox): Stepwise Regression Diagnostics Table; http://www.mathworks.com/access/helpdesk/help/toolbox/stats/linear19.shtml; Dec. 2002.

Linear Models (Statistics Toolbox): Stepwise Regression; http://www.mathworks.com/access/helpdesk/help/toolbox/stats/linear16.shtml; Dec. 2002.

Page, Ellis, Poggio, John, Keith, Timothy; Computer Analysis of Student Essays: Finding Trait Differences in Student Profile; Annual Meeting of the American Educational Research Association; Chicago, IL; 1997.

Page, Ellis; Project Essay Grade: PEG; Project Essay Grade (PEG), Ch. 3; pp. 43-54; 2003.

Quirk, Randolph, Greenbaum, Sidney, Leech, Geoffrey, Svartvik, Jan; A Comprehensive Grammar of the English Language; Longman Group Limited; 1985.

Regression Modeling; http://www.kellogg.nwu.edu/faculty/weber/emp/Modeling.htm; Dec. 2002.

Salton, Gerard; Automatic Text Processing: The Transformation, Analysis, and Retrieval of Information by Computer; Addison-Wesley Series in Computer Science; 1989.

Shermis, Mark, Koch, Chantal, Page, Ellis, Keith, Timothy, Harrington, Susanmarie; Trait Ratings for Automated Essay Grading; Educational and Psychological Measurement, 62(1); pp. 5-18; 2002.

Shermis, Mark, Burstein, Jill; Validity of Automated Essay Scoring Systems; Automated Essay Scoring: A Cross-Disciplinary Perspective, Ch. 9; pp. 147-167; 2003.

METHODS FOR AUTOMATED ESSAY ANALYSIS

The present application is a continuation of the U.S. patent application Ser. No. 10/948,417, entitled "Methods For Automated Essay Analysis," filed on Sep. 22, 2004 now U.S. Pat. No. 7,729,655, which is a continuation of the U.S. patent application Ser. No. 10/052,380, entitled "Methods For Automated Essay Analysis," filed on Jan. 23, 2002 now U.S. Pat. No. 6,796,800. The present application, the '417 application and the '380 application claim priority to and the benefit of the U.S. Provisional Patent Application No. 60/263,223, entitled "Methods For Automated Essay Analysis," filed on Jan. 23, 2001. All of these are hereby incorporated into the present application by reference.

FIELD OF THE INVENTION

This invention relates generally to document processing and automated identification of discourse elements, such as a thesis statement, in an essay.

BACKGROUND OF THE INVENTION

Given the success of automated essay scoring technology, such application have been integrated into current standardized writing assessments. The writing community has expressed an interest in the development of an essay evaluation systems that include feedback about essay characteristics to facilitate the essay revision process.

There are many factors that contribute to overall improvement of developing writers. These factors include, for example, refined sentence structure, variety of appropriate word usage, and organizational structure. The improvement of organizational structure is believed to be critical in the essay revision process toward overall essay quality. Therefore, it would be desirable to have a system that could indicate as feedback to students, the discourse elements in their essays.

SUMMARY OF THE INVENTION

The invention facilitates the automatic analysis, identification and classification of discourse elements in a sample of text.

In one respect, the invention is a method for automated analysis of an essay. The method comprises the steps of accepting an essay; determining whether each of a predetermined set of features is present or absent in each sentence of the essay; for each sentence in the essay, calculating a probability that the sentence is a member of a certain discourse element category, wherein the probability is based on the determinations of whether each feature in the set of features is present or absent; and choosing a sentence as the choice for the discourse element category, based on the calculated probabilities. The discourse element category of preference is the thesis statement. The essay is preferably in the form of an electronic document, such as an ASCII file. The predetermined set of features preferably comprises the following: a feature based on the position within the essay; a feature based on the presence or absence of certain words wherein the certain words comprise words of belief that are empirically associated with thesis statements; and a feature based on the presence or absence of certain words wherein the certain words comprise words that have been determined to have a rhetorical relation based on the output of a rhetorical structure parser. The calculation of the probabilities is preferably done in the form of a multivariate Bernoulli model.

In another respect, the invention is a process of training an automated essay analyzer. The training process accepts a plurality of essays and manual annotations demarking discourse elements in the plurality of essays. The training process accepts a set of features that purportedly correlate with whether a sentence in an essay is a particular type of discourse element. The training process calculates empirical probabilities relating to the frequency of the features and relating features in the set of features to discourse elements.

In yet other respects, the invention is computer readable media on which are embedded computer programs that perform the above method and process.

In comparison to known prior art, certain embodiments of the invention are capable of achieving certain advantages, including some or all of the following: (1) eliminating the need for human involvement in providing feedback about an essay; (2) improving the timeliness of feedback to a writer of an essay; and (3) cross utilization of essay automatic essay analysis parameters determined from essays on a given topic to essays on different topics or responding to different questions. Those skilled in the art will appreciate these and other advantages and benefits of various embodiments of the invention upon reading the following detailed description of a preferred embodiment with reference to the below-listed drawings.

DETAILED DESCRIPTION OF A PREFERRED EMBODIMENT

I. Overview

Figure 1:
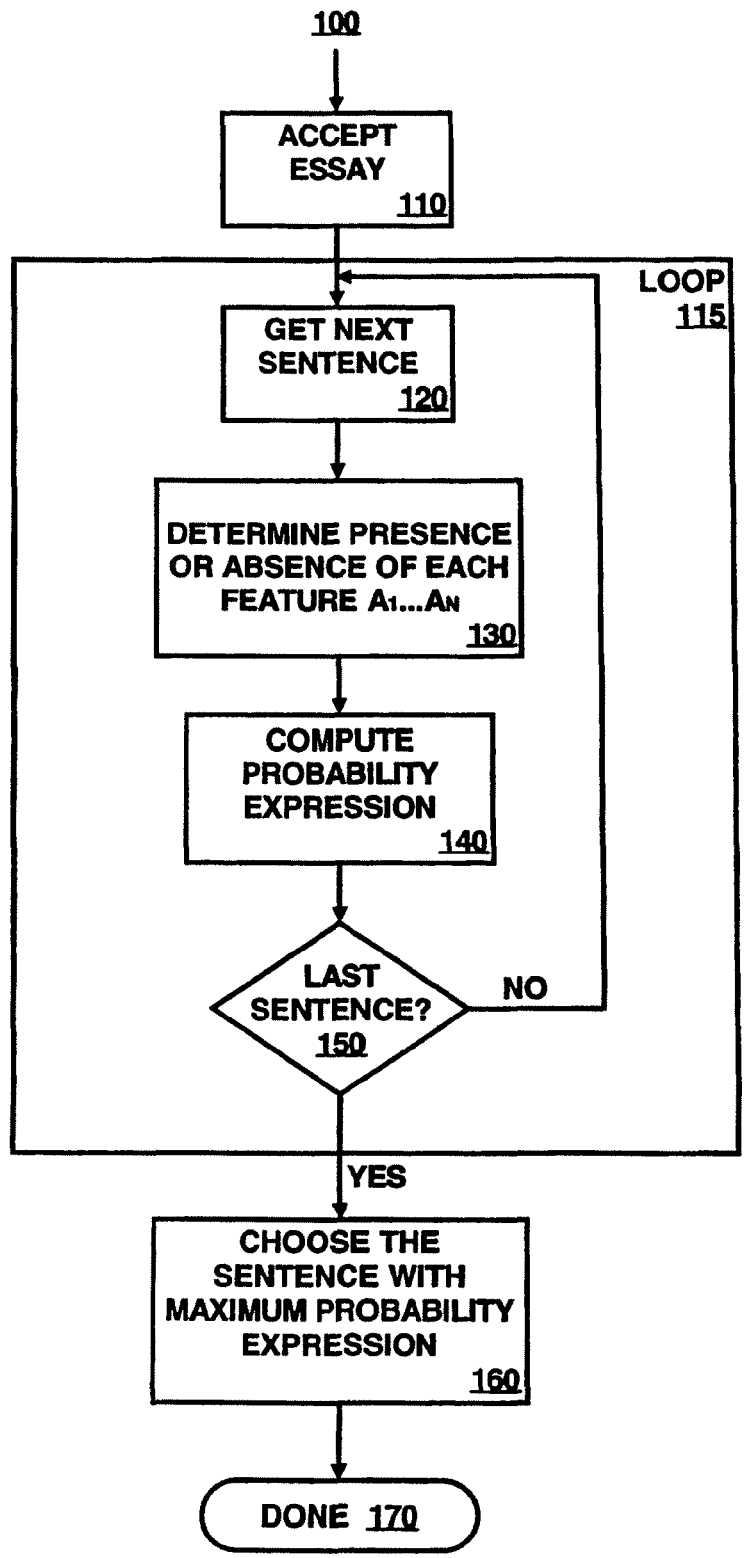
FIG. 1 is a flowchart of a method for providing automated essay feedback, according to an embodiment of the invention.

Using a small corpus of essay data where thesis statements have been manually annotated, a Bayesian classifier can be built using the following features: a) sentence position, b) words commonly used in thesis statements, and c) discourse features, based on rhetorical structure theory (RST) parses. Experimental results indicate that this classification technique may be used toward the automatic identification of thesis statements in essays. Furthermore, the method generalizes across essay topics.

A thesis statement is generally defined as the sentence that explicitly identifies the purpose of the paper or previews its main ideas. Although this definition seems straightforward enough, and would lead one to believe that even for people to identify the thesis statement in an essay would be clear-cut. However, this is not always the case. In essays written by developing writers, thesis statements are not so clearly and ideas are repeated. As a result, human readers sometimes independently choose different thesis statements from the same student essay.

The value of this system is that it can be used to indicate as feedback to students, the discourse elements in their essays is advantageous. Such a system could present to students a guided list of questions to consider about the quality of the discourse. For instance, it has been suggested by writing experts that if the thesis statement of a student's essay could be automatically provided, the student could then use this information to reflect on the thesis statement and its quality. In addition, such an instructional application could utilize the thesis statement to discuss other types of discourse elements in the essay, such as the relationship between the thesis statement and the conclusion, and the connection between the thesis statement and the main points in the essay. In the teaching of writing, students are often presented with a "Revision Checklist." The "Revision Checklist" is intended to facilitate the revision process. This is a list of questions posed to the student that help the student reflect on the quality of their writing. So, for instance, such a list might pose questions as in the following. (a) Is the intention of my thesis statement clear?, (b) Does my thesis statement respond directly to the essay question?, (c) Are the main points in my essay clearly stated?, and (d) Do the main points in my essay relate to my original thesis statement?

The ability to automatically identify, and present to students the discourse elements in their essays can help them to focus and reflect on the critical discourse structure of the essay. In addition, the ability for the application to indicate to the student that a discourse element could not be located, perhaps due to the 'lack of clarity' of this element could also be helpful. Assuming that such a capability were reliable, this would force the writer to think about the clarity of a given discourse element, such as a thesis statement.

II. Providing Automated Essay Analysis

FIG. 1 is a flowchart of a method 100 for providing automated essay analysis, according to an embodiment of the invention. The method 100 estimates which sentence in an essay is most likely to belong to a certain discourse category, such as thesis statement, conclusion, etc. The method 100 begins by accepting (110) an essay. The essay is preferably in electronic form at this step. The method 100 next performs a loop 115. The method 100 makes one pass through the loop 115 for each sentence in the essay. Each pass of the loop 115 gets (120) the next sentence and determines (130) the presence or absence of each feature $A_1 \ldots A_n$ (the feature $A_1 \ldots A_n$ having been predetermined to be relevant to the particular discourse category). If more than one discourse categories is evaluated, a different set of features $A_1 \ldots A_n$ may be predetermined for each discourse category. The loop 115 next computes (140) a probability expression for each sentence (S) for the discourse category (T) using the formula below.

$$\log[P(T|S)] = \log[P(T)] + \sum_i \begin{matrix} \log[P(A_i|T)/P(A_i)] & \text{if } A_i \text{ present} \\ \log[P(\overline{A_i}|T)/P(\overline{A_i})] & \text{if } A_i \text{ not present} \end{matrix}$$

where P(T) is the prior probability that a sentence is in discourse category T; $P(A_i|T)$ is the conditional probability of a sentence having feature $A_i$, given that the sentence is in T; $P(A_i)$ is the prior probability that a sentence contains feature $A_i$; $P(\overline{A_i}|T)$ is the conditional probability that a sentence does not have feature $A_i$, given that it is in T; and $P(\overline{A_i})$ is the prior probability that a sentence does not contain feature $A_i$. Performance can be improved by using a LaPlace estimator to deal with cases when the probability estimates are zero.

The method 100 next tests (150) whether the current resource is the last and loops back to the getting next sentence step 120 if not. After a probability expression has been evaluated for every sentence, the method 100 chooses (160) the sentence with the maximum probability expression for the particular discourse category. The method 100 can be repeated for each different discourse category.

Preferably, the accepting step 110 directly accepts the document in an electronic form, such as an ASCII file. In another embodiment, the accepting step 110 comprises the steps of scanning a paper form of the essay and performing optical character recognition on the scanned paper essay.

In one embodiment, the determining step 130 and computing step 140 repeat through the indexed list of features $A_1 \ldots A_N$ and updates the value of the probability expression based on the presence or absence of each feature $A_1 \ldots A_N$. Another embodiment of the determining step 130 and computing step 140 is that the presence or absence of all features $A_1 \ldots A_N$ could be determined (130) and then the probability expression could be computed (140) for that sentence. Those skilled in the art can appreciate that the steps of the method 100 can be performed in an order different from that illustrated, or simultaneously, in alternative embodiments.

III. Example of Use

As an example of the method 100, consider the case when the discourse category is a thesis statement, so that the method 100 estimates which sentence in an essay is most likely to be the thesis statement. Assume that the method 100 utilizes only positional and word occurrence features to identify the thesis statement, as follows:

$A_1$=W_FEEL=Occurrence of the word "feel."
$A_2$=SP_1=Being the first sentence in an essay.
$A_3$=SP_2=Being the second sentence in an essay.
$A_4$=SP_3=Being the third sentence in an essay.
$A_5$=SP_4=Being the fourth sentence in an essay.
Etc.

Assume further that the prior and conditional probabilities for these features have been predetermined or otherwise supplied. Typically, these probabilities are determined by a training process (as described in detail below with reference to FIG. 2). For this example, assume that the above features were determined empirically by examining 93 essays containing a grand total of 2391 sentences, of which 111 were denoted by a human annotator as being thesis statements. From this data set, the following prior probabilities were determined by counting frequencies of feature occurrence out of the total number of sentences (where the preceding slash "/" denotes the "not" or complement operator):

P(THESIS)=111/2391=0.0464
P(W_FEEL)=188/2391=0.0786
P(/W_FEEL)=1−0.0786=0.9213
P(SP_1)=93/2391=0.0388
P(/SP_1)=1−0.0388=0.9611
P(SP_2)=93/2391=0.0388
P(/SP_2)=1−0.0388=0.9611
P(SP_3)=93/2391=0.0388
P(/SP_3)=1−0.0388=0.9611
P(SP_4)=93/2391=0.0388
P(/SP_4)=1−0.0388=0.9611

It can be seen from these numbers, that every essay in the training set contained at least four sentences. One skilled in the art could continue with additional sentence position feature probabilities, but only four are needed in the example that follows.

From the same data set, the following conditional probabilities were determined by counting frequencies of feature occurrence out of the thesis sentences only:

P(W_FEEL|THESIS)=35/111=0.3153
P(/W_FEEL|THESIS)=1−0.1861=0.6847
P(SP_1|THESIS)=24/111=0.2162

P(/SP_1|THESIS)=1−0.2162=0.7838
P(SP_2|THESIS)=15/111=0.1612
P(/SP_2|THESIS)=1−0.1612=0.8388
P(SP_3|THESIS)=13/111=0.1171
P(/SP_3|THESIS)=1−0.1171=0.8829
P(SP_4|THESIS)=14/111=0.1262
P(/SP_4|THESIS)=1−0.1262=0.8739

With this preliminary data set, the method 100 begins by reading (110) the following brief essay:

> Most of the time we as people experience a lot of conflicts in life. We put are selfs in conflict every day by choosing between something that we want to do and something that we feel we should do. For example, I new friends and family that they wanted to go to the army. But they new that if they went to college they were going to get a better education. And now my friends that went to the army tell me that if they had that chance to go back and make that choice again, they will go with the feeling that will make a better choice.

The method 100 loops through each sentence of the above essay, sentence by sentence. The first sentence, denoted S1, is "Most of the time . . . life." The observed features of S1 are /W_FEEL, SP_1,/SP_2,/SP_3 and /SP_4, as this sentence is the first sentence of the essay and does not contain the word "feel." The probability expression for this sentence is computed (140) as follows:

$$\log[P(T \mid S1)] = \log[P(T)] +$$
$$\log[P(/\text{W\_FEEL} \mid T)/P(/\text{W\_FEEL})] +$$
$$\log[P(\text{SP\_1} \mid T)/P(\text{SP\_1})] +$$
$$\log[P(/\text{SP\_2} \mid T)/P(/\text{SP\_2})] +$$
$$\log[P(/\text{SP\_3} \mid T)/P(/\text{SP\_3})] +$$
$$\log[P(/\text{SP\_4} \mid T)/P(/\text{SP\_4})]$$
$$= \log[0.0464] +$$
$$\log[0.6847/0.9213] +$$
$$\log[0.2162/0.0388] +$$
$$\log[0.8388/0.9611] +$$
$$\log[0.8829/0.9611] +$$
$$\log[0.8739/0.9611]$$
$$= -0.8537$$

The second "sentence," denoted S2, is actually two sentence, but the method can treat a group of sentences as single sentence, when, for example, the sentences are related in a certain manner, such as in this case where the second sentence begins with the phrase "For example . . . ." Thus, S2 in this example is "We put . . . army." It's features are /SP_1, SP_2,/SP_3,/SP_4and W_FEEL, as would be determined by the step 130. Computing (140) the probability expression for S2 is done as follows:

$$\log[P(T \mid S2)] = \log[P(T)] +$$
$$\log[P(\text{W\_FEEL} \mid T)/P(\text{W\_FEEL})] +$$
$$\log[P(/\text{SP\_1} \mid T)/P(/\text{SP\_1})] +$$
$$\log[P(\text{SP\_2} \mid T)/P(\text{SP\_2})] +$$

-continued
$$\log[P(/\text{SP\_3} \mid T)/P(/\text{SP\_3})] +$$
$$\log[P(/\text{SP\_4} \mid T)/P(/\text{SP\_4})]$$
$$= \log[0.0464] +$$
$$\log[0.3153/0.0786] +$$
$$\log[0.7838/0.9611] +$$
$$\log[0.1612/0.0388] +$$
$$\log[0.8829/0.9611] +$$
$$\log[0.8739/0.9611]$$
$$= -0.2785$$

Likewise, for the third sentence, it's features are /W_FEEL,/SP_1,/SP_2, SP_3and /SP_4, and its probability expression value is −1.1717. The probability expression value for the fourth sentence is −1.1760. The maximum probability expression value is −0.2785, corresponding to S2. Thus, the second sentence is chosen (160) as the most likely thesis statement, according to the method 100.

Note that the prior probability term P(T) is the same for every sentence; thus, this term can be ignored for purposes of the method 100 for a given discourse category. Note also that while the preceding calculations were performed using base-10 logarithms, any base (e.g., natural logarithm, ln) can be used instead, provided the same base logarithm is used consistently.

IV. Constructing the Automatic Essay Analyzer

Figure 2:
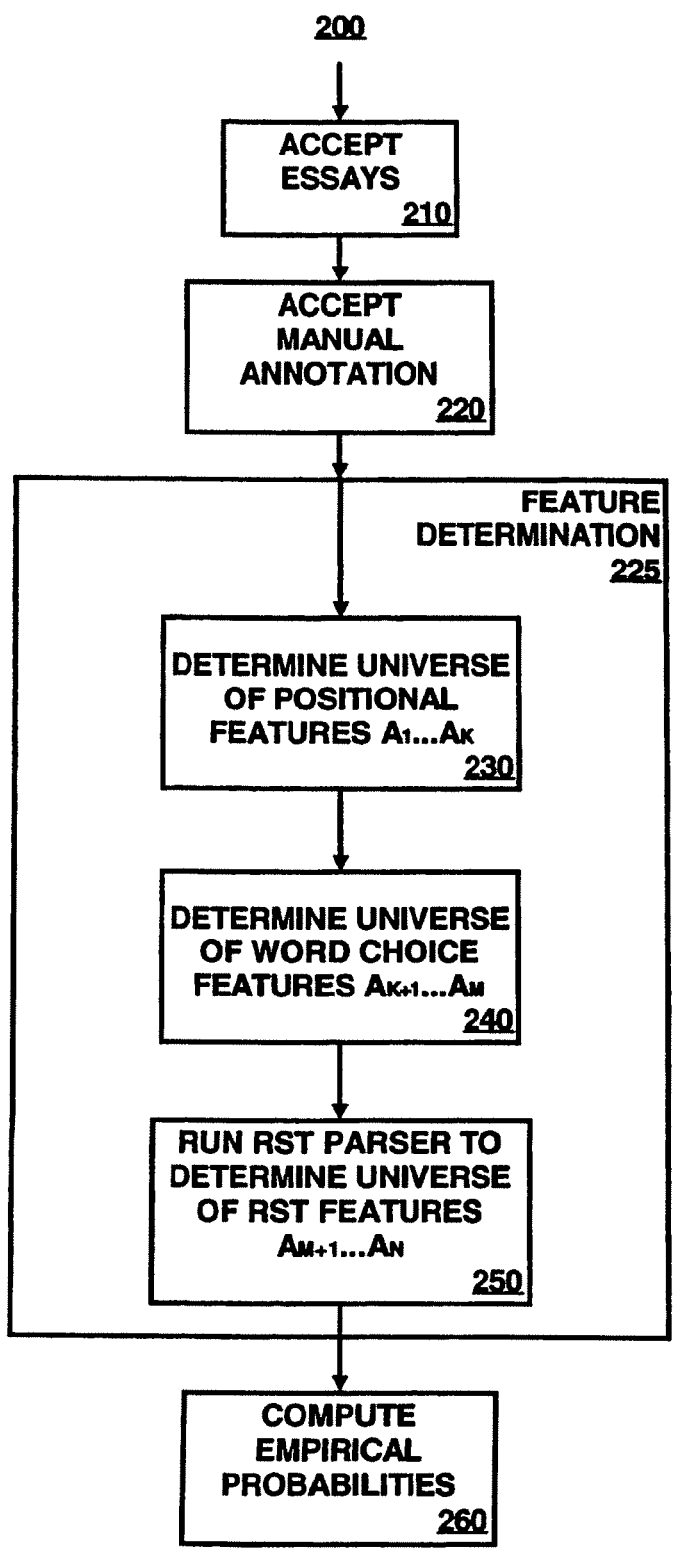
FIG. 2 is a flowchart of a process for training the automated essay feedback method of FIG. 1, according to an embodiment of the invention.

FIG. 2 is a flowchart of a process 200 for training the method 100, according to an embodiment of the invention. The process 200 begins by accepting (210) a plurality of essays. The essays are preferably in electronic form at this step. The method 200 then accepts (210) manual annotations. The method 200 then determines (225) the universe of all possible features $A_i \ldots A_n$. Finally, method 200 computes (260) the empirical probability relating to each feature $A_i$ across the plurality of essays.

The preferred method of accepting (210) the plurality of essays is in the form of electronic documents and the preferred electronic format is ASCII. The preferred method of accepting (210) the plurality of essays is in the form of stored or directly entered electronic text. Alternatively or additionally, the essays could be accepted (210) utilizing a method comprised of the steps of scanning the paper forms of the essays, and performing optical character recognition on the scanned paper essays.

The preferred method of accepting (220) manual annotations is in the form of electronic text essays that have been manually annotated by humans skilled in the art of discourse element identification. The preferred method of indicating the manual annotation of the pre-specified discourse elements is by the bracketing of discourse elements within starting and ending "tags" (e.g. <Sustained Idea> . . . </Sustained Idea>, <Thesis Statement> . . . </Thesis Statement>).

The preferred embodiment of method 200 then determines (225) the universe of all possible features for a particular discourse item. The feature determination step 225 begins by determining (230) the universe of positional features $A_1 \ldots A_k$. Next, the feature determination step 225 determines (240) the universe of word choice features $A_{k+1} \ldots A_m$. Finally, the feature determination step 225 determines (250) the universe of rhetorical structure theory (RST) features $A_{m+1} \ldots A_N$.

An embodiment of the positional features determination step 230 loops through each essay in the plurality of essays, noting the position of demarked discourse elements within each essay and determining the number of sentences in that essay.

An embodiment of the word choice features determination step 240 parses the plurality of essays and create a list of all words contained within the sentences marked by a human annotator as being a thesis statement. Alternatively or additionally, the word choice features $A_{k+1} \ldots A_m$ universe determination step 240 can accept a list of predetermined list of words of belief, words of opinion, etc.

An embodiment of the RST (rhetorical structure theory) features determination step 250 parses the plurality of essays to extract pertinent. The RST parser of preference utilized in step 250 is described in Marcu, D., "The Rhetorical Parsing of Natural Language Texts," Proceedings of the 35th Annual Meeting of the Assoc. for Computational Linguistics, 1997, pp. 96-103, which is hereby incorporated by reference. Further background on RST is available in Mann, W. C. and S. A. Thompson, "Rhetorical Structure Theory: Toward a Functional Theory of Text Organization," Text 8(3), 1988, pp. 243-281, which is also hereby incorporated by reference.

For each discourse element, the method 200 computes (260) the empirical frequencies relating to each feature $A_i$ across the plurality of essays. For a sentence (S) in the discourse category (T) the following probabilities are determined for each $A_i$: P(T), the prior probability that a sentence is in discourse category T; $P(A_i|T)$, the conditional probability of a sentence having feature $A_i$, given that the sentence is in T; $P(A_i)$, the prior probability that a sentence contains feature $A_i$; $P(\overline{A}_i|T)$, the conditional probability that a sentence does not have feature $A_i$, given that it is in T; and $P(\overline{A}_i)$ the prior probability that a sentence does not contain feature $A_i$.

The method 100 and the process 200 can be performed by computer programs. The computer programs can exists in a variety of forms both active and inactive. For example, the computer programs can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the computer programs can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

V. Experiments Using the Automated Essay Analyzer

A. Experiment 1—Baseline

Experiment 1 utilizes a Bayesian classifier for thesis statements using essay responses to one English Proficiency Test (EPT) question: Topic B. The results of this experiment suggest that automated methods can be used to identify the thesis statement in an essay. In addition, the performance of the classification method, given even a small set of manually annotated data, appears to approach human performance, and exceeds baseline performance.

In collaboration with two writing experts, a simple discourse-based annotation protocol was developed to manually annotate discourse elements in essays for a single essay topic. This was the initial attempt to annotate essay data using discourse elements generally associated with essay structure, such as thesis statement, concluding statement, and topic sentences of the essay's main ideas. The writing experts defined the characteristics of the discourse labels. These experts then completed the subsequent annotations using a PC-based interface implemented in Java.

Table 1 indicates agreement between two human annotators for the labeling of thesis statements. In addition, the table shows the baseline performance in two ways. Thesis statements commonly appear at the very beginning of an essay. So, we used a baseline method where the first sentence of each essay was automatically selected as the thesis statement. This position-based selection was then compared to the resolved human annotator thesis selection (i.e., final annotations agreed upon by the two human annotators) for each essay (Position-Based&H). In addition, random thesis statement selections were compared with humans 1 and 2, and the resolved thesis statement (Random&H). The % Overlap column in Table 1 indicates the percentage of the time that the two annotators selected the exact same text as the thesis statement. Kappa between the two human annotators was 0.733. This indicates good agreement between human annotators. This kappa value suggests that the task of manual selection of thesis statements was well-defined.

TABLE 1

| Annotators | % Overlap |
| --- | --- |
| 1&2 | 53.0% |
| Position-Based&H | 24.0% |
| Random&H | 7.0% |

B. Experiment 2

Experiment 2 utilized three general feature types to build the classifier: a) sentence position, b) words commonly occurring in a thesis statement, and c) RST labels from outputs generated by an existing rhetorical structure parser (Marcu, 1997). Trained the classifier to predict thesis statements in an essay. Using the multivariate Bernoulli formula, below, this gives us the log probability that a sentence (S) in an essay belongs to the class (T) of sentences that are thesis statements.

Experiment 2 utilized three kinds of features to build the classifier. These were a) positional, b) lexical, and c) Rhetorical Structure Theory-based discourse features (RST). With regard to the positional feature, we found that in the human annotated data, the annotators typically marked a sentence as being a thesis toward the beginning of the essay. So, sentence position was a relevant feature. With regard to lexical information, our research indicated that if we used as features the words in sentences annotated as thesis statements that this also proved to be useful toward the identification of a thesis statement. In addition information from RST-based parse trees is or can be useful.

Two kinds of lexical features were used in Experiment 2: a) the thesis word list, and b) the belief word list. For the thesis word list, we included lexical information in thesis statements in the following way to build the thesis statement classifier. For the training data, a vocabulary list was created that included one occurrence of each word used in a thesis statement (in training set essays). All words in this list were used as a lexical feature to build the thesis statement classifier. Since we found that our results were better if we used all words used in thesis statements, no stop list was used. The belief word list included a small dictionary of approximately 30 words and phrases, such as opinion, important, better, and in order that. These words and phrases were common in thesis statement text. The classifier was trained on this set of words, in addition to the thesis word vocabulary list.

According to RST, one can associate a rhetorical structure tree to any text. The leaves of the tree correspond to elementary discourse units and the internal nodes correspond to contiguous text spans. Text spans represented at the clause and sentence level. Each node in a tree is characterized by a status (nucleus or satellite) and a rhetorical relation, which is a relation that holds between two non-overlapping text spans. The distinction between nuclei and satellites comes from the empirical observation that the nucleus expresses what is more essential to the writer's intention than the satellite; and that the nucleus of a rhetorical relation is comprehensible independent of the satellite, but not vice versa. When spans are equally important, the relation is multinuclear Rhetorical relations reflect semantic, intentional, and textual relations that hold between text spans. For example, one text span may elaborate on another text span; the information in two text spans may be in contrast; and the information in one text span may provide background for the information presented in another text span. The algorithm considers two pieces of information from RST parse trees in building the classifier a) is the parent node for the sentence a nucleus or a satellite, and b) what elementary discourse units are associated with thesis versus non-thesis sentences.

In Experiment 2, we examined how well the algorithm performed compared to the agreement of two human judges, and the baselines in Table 1. Table 2 indicates performance for 6 cross-validation runs. In these runs, ⅚ of the data were used for training and ⅙ for subsequent cross-validation. Agreement is evaluated on the ⅙ of the data. For this experiment inclusion of the following features to build the classifier yielded the results in Table 2: a) sentence position, b) both RST feature types, and c) the thesis word list. We applied this cross-validation method to the entire data set (All), where the training sample contained 78 thesis statements, and to a gold-standard set where 49 essays (GS) were used for training. The gold-standard set includes essays where human readers agreed on annotations independently. The evaluation compares agreement between the algorithm and the resolved annotation (A&Res), human annotator 1 and the resolved annotation (1&Res), and human annotator 2 and the resolved annotation (2&Res). "% Overlap" in Table 2 refers to the percentage of the time that there is exact overlap in the text of the two annotations. The results are exceed both baselines in Table 1.

TABLE 2

Mean percent overlap for 6 cross-validation runs.

| Annotators | N | Matches | % Overlap Agreement |
|---|---|---|---|
| All: A&Res | 15.5 | 7.7 | 50.0 |
| GS: A&Res | 9 | 5.0 | 56.0 |

TABLE 2-continued

Mean percent overlap for 6 cross-validation runs.

| Annotators | N | Matches | % Overlap Agreement |
|---|---|---|---|
| 1&Res | 15.5 | 9.9 | 64.0 |
| 2&Res | 15.5 | 9.7 | 63.0 |

C. Experiment 3

A next experiment shows that thesis statements in essays appear to be characteristically different from a summary sentence in essays, as they have been identified by human annotators.

For the Topic B data from Experiment 1, two human annotators used the same PC-based annotation interface in order to annotate one-sentence summaries of essays. A new labeling option was added to the interface for this task called "Summary Sentence". These annotators had not seen these essays previously, nor had they participated in the previous annotation task. Annotators were asked to independently identify a single sentence in each essay that was the summary sentence in the essay.

The kappa values for the manual annotation of thesis statements (Th) as compared to that of summary statements (SumSent) shows that the former task is much more clearly defined. We see that the kappa of 0.603 does not show strong agreement between annotators for the summary sentence task. For the thesis annotation task, the kappa was 0.733 which shows good agreement between annotators. In Table 3, the results strongly indicate that there was very little overlap in each essay between what human annotators had labeled as thesis statements in the initial task, and what had been annotated as a summary sentence (Th/SumSent Overlap). This strongly suggests that there are critical differences between thesis statements and summary sentences in essays that we are interested in exploring further. Of interest is that some preliminary data indicated that what annotators marked as summary sentences appear to be more closely related to concluding statements in essay.

TABLE 3

Kappa and Percent Overlap Between Manual Thesis Selections (Th) and Summary Statements (SumSent)

| | Th | SumSent | Th/SumSent | Overlap |
|---|---|---|---|---|
| Kappa | .733 | .603 | N/A | |
| % Overlap | .53 | .41 | .06 | |

From the results in Table 3, we can infer that thesis statements in essays are a different genre than, say, a problem statement in journal articles. From this perspective, the thesis classification algorithm appears to be appropriate for the task of automated thesis statement identification.

D. Experiment 4

How does the algorithm generalize across topics? The next experiment tests the generalizability of the thesis selection method. Specifically, this experiment answers the question whether there were positional, lexical, and discourse features that underlie a thesis statement, and whether or not they were topic independent. If so, this would indicate an ability to annotate thesis statements across a number of topics, and re-use the algorithm on additional topics, without further annotation. A writing expert manually annotated the thesis statement in approximately 45 essays for 4 additional topics: Topics A, C, D and E. She completed this task using the same interface that was used by the two annotators in Experiment 1. The results of this experiment suggest that the positional, lexical, and discourse structure features applied in Experiments 1 and 2 are generalizable across essay topic.

To test the generalizability of the method, for each EPT topic the thesis sentences selected by a writing expert were used for building the classifier. Five combinations of four prompts were used to build the classifier in each case, and that classifier was then cross-validated on the fifth topic, not used to build the classifier. To evaluate the performance of each of the classifiers, agreement was calculated for each 'cross-validation' sample (single topic) by comparing the algorithm selection to our writing expert's thesis statement selection. For example, we trained on Topics A, B, C, and D, using the thesis statements selected manually. This classifier was then used to select, automatically, thesis statements for Topic E. In the evaluation, the algorithm's selection was compared to the manually selected set of thesis statements for Topic E, and agreement was calculated. Exact matches for each run are presented in Table 4. In all but one case, agreement exceeds both baselines from Table 1. In two cases, where the percent overlap was lower, on cross-validation (Topics A and B), we were able to achieve higher overlap using the vocabulary in belief word list as features, in addition to the thesis word list vocabulary. In the case of Topic A, we achieved higher agreement only when adding the belief word list feature and applying the classical Bayes approach (see footnote 2). Agreement was 34% (17/50) for Topic B, and 31% (16/51) for Topic A.

TABLE 4

Performance on a Single Cross-validation Topic (CV Topic) Using Four Unique Essay Topics for Training.

| Training Topics | CV Topic | N  | Matches | % Overlap |
|-----------------|----------|----|---------|-----------|
| ABCD            | E        | 47 | 19      | 40.0      |
| ABCE            | D        | 47 | 22      | 47.0      |
| ABDE            | C        | 31 | 13      | 42.0      |
| ACDE            | B        | 50 | 15      | 30.0      |
| BCDE            | A        | 51 | 12      | 24.0      |

The experiments described above indicate the following: With a relatively small corpus of manually annotated essay data, a multivariate Bernoulli approach can be used to build a classifier using positional, lexical and discourse features. This algorithm can be used to automatically select thesis statements in essays. Results from both experiments indicate that the algorithm's selection of thesis statements agrees with a human judge almost as often as two human judges agree with each other. Kappa values for human agreement suggest that the task for manual annotation of thesis statements in essays is reasonably well-defined. We are refining the current annotation protocol so that it defines even more clearly the labeling task. We expect that this will increase human agreement in future annotations, and the reliability of the automatic thesis selection since the classifiers are built using the manually annotated data.

The experiments also provide evidence that this method for automated thesis selection in essays is generalizable. That is, once trained on a few human annotated prompts, it could be applied to other prompts given a similar population of writers, in this case, writers at the college freshman level. The larger implication is that we begin to see that there are underlying discourse elements in essays that can be identified, independent of the topic of the test question. For essay evaluation applications this is critical since new test questions are continuously being introduced into on-line essay evaluation applications. It would be too time-consuming and costly to repeat the annotation process for all new test questions.

V. Conclusion

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

We claim:

1. A processor-implemented method for creating a mathematical model for use in identifying discourse elements, the method comprising:
   receiving a plurality of first essays relating to a particular subject;
   wherein each first essay is in an electronic format;
   receiving annotations for each first essay;
   wherein each annotation identifies at least one discourse element;
   identifying features with a processor;
   wherein each feature is exhibited by at least one identified discourse element;
   computing empirical frequencies with a processor;
   wherein each empirical frequency relates to the presence of a feature with respect to the identified discourse elements across the plurality of first essays;
   associating with a processor each empirical frequency with the related identified discourse element; and
   utilizing the empirical frequencies to select discourse elements in at least one second essay.

2. The method of claim 1, wherein the annotations are prepared by human annotators.

3. The method of claim 1, wherein the annotations are indicated by the bracketing of the at least one identified discourse elements within starting and ending tags.

4. The method of claim 1, wherein the features comprise positional features, word choice features, or rhetorical structure theory features.

5. The method of claim 1, wherein the step of identifying features comprises:
   determining positional features;
   determining word choice features; and
   determining rhetorical structure theory features.

6. The method of claim 5, wherein the step of determining positional features comprises:
   looping through each first essay;
   noting the position of the at least one identified discourse element within the essay; and
   determining the number of sentences in the essay.

7. The method of claim 5, wherein the step of determining word choice features comprises:
   parsing the plurality of first essays; and
   creating a list of words contained within sentences marked by an annotator as being a thesis statement.

8. The method of claim 5, wherein the step of determining word choice features comprises:
   accepting a list of predetermined words of belief, or words of opinion.

9. The method of claim 5, wherein the step of determining rhetorical structure theory features comprises:
parsing the plurality of first essays to extract pertinent rhetorical structure theory features.

10. The method of claim 1, wherein the at least one identified discourse element comprises a sentence in a discourse element category.

11. The method of claim 10, wherein the step of computing empirical probabilities with respect to a sentence in a discourse element category comprises:
computing the following probabilities related to each identified feature:
a prior probability that the sentence is in a discourse element category;
a conditional probability of the sentence having the identified feature given that the sentence is in a discourse element category;
a prior probability that the sentence contains the identified feature;
a conditional probability that the sentence does not have the identified feature given that the sentence is in a discourse element category; and
a prior probability that the sentence does not contain the identified feature.

12. The method of claim 1, wherein the electronic format is ASCII.

13. The method of claim 1, wherein the plurality of first essays are received as stored or directly entered electronic text, or are received using a method comprising:
scanning paper forms of the plurality of first essays; and
performing optical character recognition on the scanned paper essays.

14. A system for creating a mathematical model for use in identifying discourse elements, the system comprising:
a data processor; and
computer-readable memory in communication with the data processor encoded with instructions for commanding the data processor to execute steps comprising:
receiving a plurality of first essays relating to a particular subject;
wherein each first essay is in an electronic format;
receiving annotations for each first essay;
wherein each annotation identifies at least one discourse element;
identifying features with a processor;
wherein each feature is exhibited by at least one identified discourse element;
computing empirical frequencies with a processor;
wherein each empirical frequency relates to the presence of a feature with respect to the identified discourse elements across the plurality of first essays;
associating with a processor each empirical frequency with the related identified discourse element; and
utilizing the empirical frequencies to select discourse elements in at least one second essay.

15. The system of claim 14, wherein the features comprise positional features, word choice features, or rhetorical structure theory features.

16. The system of claim 14, wherein the step of identifying features comprises:
determining positional features;
determining word choice features; and
determining rhetorical structure theory features.

17. The system of claim 16, wherein the step of determining positional features comprises:
looping through each first essay;
noting the position of the at least one identified discourse element within the essay; and
determining the number of sentences in the essay.

18. The system of claim 16, wherein the step of determining word choice features comprises:
parsing the plurality of first essays and creating a list of words contained within sentences marked by an annotator as being a thesis statement; or accepting a list of predetermined words of belief, or words of opinion.

19. The system of claim 16, wherein the step of determining rhetorical structure theory features comprises:
parsing the plurality of first essays to extract pertinent rhetorical structure theory features.

\* \* \* \* \*